United States Patent
Rump

(10) Patent No.: US 9,812,227 B2
(45) Date of Patent: Nov. 7, 2017

(54) METHOD FOR THE CONSTRUCTION OF A SECURE NUCLEAR REACTOR PLANT, AND CORRESPONDING REACTOR PLANT

(76) Inventor: Björn Sigurd Rump, Vandoeuvres (CH)

( * ) Notice: Subject to any disclaimer, the term of this patent is extended or adjusted under 35 U.S.C. 154(b) by 303 days.

(21) Appl. No.: 14/130,360

(22) PCT Filed: Jul. 2, 2012

(86) PCT No.: PCT/IB2012/001719
§ 371 (c)(1),
(2), (4) Date: Feb. 25, 2014

(87) PCT Pub. No.: WO2013/005111
PCT Pub. Date: Jan. 10, 2013

(65) Prior Publication Data
US 2014/0161217 A1    Jun. 12, 2014

(30) Foreign Application Priority Data
Jul. 2, 2011    (CH) ........................... 1114/11

(51) Int. Cl.
*G21C 13/024*    (2006.01)
*G21D 1/00*    (2006.01)
*G21F 7/00*    (2006.01)

(52) U.S. Cl.
CPC ............. *G21D 1/00* (2013.01); *G21F 7/00* (2013.01); *Y02E 30/40* (2013.01)

(58) Field of Classification Search
CPC ...... G21C 11/02; G21C 13/024; G21C 13/10; G21C 13/093; G21C 13/028
USPC .................. 376/273, 274; 166/247
See application file for complete search history.

(56) References Cited

U.S. PATENT DOCUMENTS

| | | | | |
|---|---|---|---|---|
| 3,089,834 A | * | 5/1963 | Dahl | G21C 13/00 376/273 |
| 5,223,208 A | * | 6/1993 | Ishimaru | G21C 13/00 376/273 |
| 5,746,540 A | * | 5/1998 | Hindle | G21D 1/003 376/273 |

FOREIGN PATENT DOCUMENTS

| | | |
|---|---|---|
| DE | 10 46 790 B | 12/1958 |
| GB | 899 851 A | 6/1962 |
| JP | 5 039620 A | 2/1993 |
| SE | 7 508 757 A | 2/1977 |

OTHER PUBLICATIONS

International Search Report, dated Feb. 6, 2013, from corresponding PCT application.

* cited by examiner

*Primary Examiner* — Jack W Keith
*Assistant Examiner* — Lily C Garner
(74) *Attorney, Agent, or Firm* — Young & Thompson

(57) ABSTRACT

Disclosed is a method for building a nuclear reactor installation including a containment chamber surrounded by a protective casing. The method is characterised by the following essential construction phases: finding or preparing a cavern (2) in rocky ground or a mountain (3) which is connected to the outside world via a tunnel or shaft (4), constructing or introducing a sealed protective casing (5) made of steel which delimits the containment chamber (1) forming an enveloping intermediate chamber volume (6) between the protective casing (5) and the cavern walls (2'), and, filling the intermediate chamber (6) with concrete or cement (6'), with the exception of the tunnel or shaft (4).

9 Claims, 1 Drawing Sheet

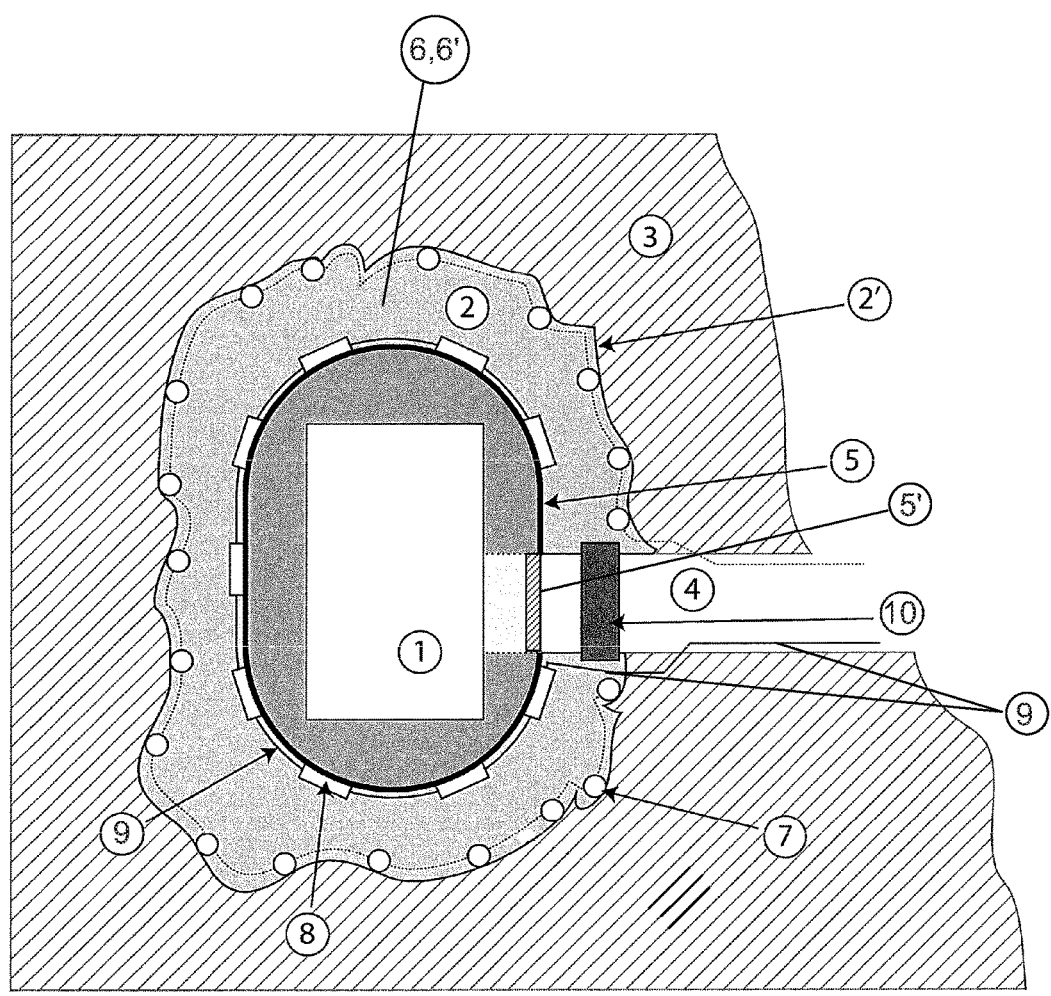

METHOD FOR THE CONSTRUCTION OF A SECURE NUCLEAR REACTOR PLANT, AND CORRESPONDING REACTOR PLANT

The present invention relates to a method for building a safe nuclear reactor installation and a corresponding plant.

There are an enormous number of inventions aimed at increasing the safety of nuclear reactors.

Accidents that are known about have caused considerable amounts of damage, particularly over a long period, through the dissemination of the products of radioactive fission. However, it was only the second severe failure of nuclear reactors in Fukushima which proved that the current safety measures for nuclear reactors are not safe enough.

For such accidents there is thus an urgent need to reduce the spread of radioactive fission products to a minimum, if not to prevent it altogether.

In addition, modern nuclear power reactors are difficult to shut down and are vulnerable to enemy attack, either from aircraft or missiles or even terrorists.

The underlying objective of the following invention is to address the said problems as far as possible at minimum expense.

Said objective is achieved according to the invention by means of a method for building a nuclear power plant comprising a containment chamber surrounded by a protective casing, characterised by the following essential construction phases:

finding or preparing a cavern in rocky ground or a mountain which is connected to the outside world via a tunnel, a shaft, or an access tunnel (as the only access), constructing or introducing a sealed protective casing made of steel which delimits the containment chamber completely/all around forming an enveloping intermediate chamber volume between the protective casing and the cavern walls, and, filling the intermediate chamber with concrete or cement, with the exception of the tunnel or shaft.

The invention also relates to a nuclear reactor installation comprising a containment chamber sealing from liquids and gases which is surrounded by a protective casing (all around), characterised in that, the protective casing is arranged in a natural or artificial cavern located in rocky ground or a mountain and is connected via a tunnel or shaft as the only access to the outside world, the protective casing includes on the inside a sealed protective casing made of steel, between the protective casing and the cavern walls an enveloping intermediate chamber is provided which is filled with concrete or cement, apart from the tunnel or shaft, which is preferably configured to be horizontal or inclined slightly towards the outside.

The method of construction according to the invention can also include other technical measures or steps which are characterised in particular in that:

prior to filling the intermediate chamber with concrete, the cavern walls are sealed with respect to or towards gases and liquids, in particular in manner known from tunnel building technology;

after filling the intermediate chamber with concrete the rock material of the cavern is sealed in addition from gases and liquids;

the additional sealing is performed by injecting a liquid sealant through a pipe system which is applied and distributed around the cavern walls;

prior to filling the intermediate chamber with concrete, hollow chambers are configured, outside the protective casing, in particular delimited directly on the outer surface and preferably by corresponding steel casings;

prior to filling the intermediate chamber with concrete, connecting pipes are set up which connect the hollow chambers to one another and/or to the outside world via the tunnel;

prior to filling the intermediate chamber with concrete the seal of the protective casing is checked by using internal excess pressure over a specific time period;

the cooling tower or towers are also built into the rock, and/or the method also comprises forming i) a sealable opening in the protective casing into which the tunnel opens and ii) at least one door that protects against radiation and excess pressure or a corresponding movable shield in the tunnel, wherein the latter has at least a cross section that is sufficient for maintenance and replacement purposes.

Furthermore, a person skilled in the art would know how to plan and configure the additional dimensions and facilities of the plant necessary for the subsequent operation of the reactor.

By constructing reactors underground or in rock caverns any breakout after a MCA (maximum credible accident) is almost completely eliminated.

A MCA can be triggered by external or internal accidents. The risk of external attack is almost completely avoided by means of the invention. Firstly, an underground plant is much more difficult to locate for enemy aircraft or missiles. Secondly, a huge amount of additional energy would be needed to penetrate a natural protective shield made of rock and/or sediment layers several meters thick and cause the actual protective casing made of concrete and/or steel to leak and in the worst case scenario lead to the escape of radioactive material.

A reactor designed according to the invention is also much more difficult for terrorists to attack from the inside. A single access route underground can be controlled very efficiently. Even if terrorists cause a maximum credible accident of the reactor (Chernobyl), with the correct configuration of the natural protective shield the escape of radioactive material can be prevented.

BRIEF DESCRIPTION OF THE DRAWING

The invention is described in more detail in connection with the attached sole drawing FIGURE, schematically illustrating a cross section of a nuclear reactor installation as disclosed.

The nuclear reactor installation shown is provided with a containment chamber 1 which is sealed from liquids and gases and is surrounded by a multilayered protective casing 5, 6'.

Said reactor plant construction is characterised in particular in that:

the protective casing 5, 6' is arranged in a natural or artificially formed cavern 2 which is located in rocky ground or a mountain 3 and is connected via a tunnel or a shaft 4 as the only access route to the outside world, the protective casing includes on the inside a sealed protective casing 5 made of steel, between the protective casing 5 and the cavern walls 2' an enveloping intermediate chamber 6 is provided which is filled with concrete or cement 6', with the exception of the tunnel or shaft 4, which is preferably configured to be horizontal or to be inclined slightly towards the outside.

After locating or digging out the cavern 2 and shaping it (thickness of the rock wall, size, shape, access, . . . ) for the application of the invention in the finished cavern 2 the protective casing made of steel 5 is constructed. Between the latter and the cavern wall 2' a volume 3 is provided which after completing the protective casing 5 is filled with concrete 6'. The minimum distance between the steel casing and the cavern wall is calculated so that an increase in gas pressure which may occur during a nuclear accident in the steel casing 5 is transmitted efficiently to the rock of the cavern 2. The steel casing is also calculated so that it mainly prevents the penetration of gases and fluids (water) charged with fission products into the rock of the cavern 2.

Prior to inserting the concrete 6' (concrete type adapted to the construction of the domed roofs of nuclear power stations) it is advantageous to provide hollow chambers 8 in steel casings outside the steel casing at the distances required by the safety regulations which are fitted with the necessary measuring devices and probes. Connecting pipes 9 between the hollow chambers 8 are already fitted and connected with the necessary measuring cables prior to the pouring of the concrete. These precautions provide additional monitoring (there is of course also internal monitoring of the reactor) even during normal operation. If there is an accident the condition, in particular the seal tightness, of the protective casing 5 can be checked and a decision can be made about further measures for preventing the escape of dangerous substances.

Depending on the mechanical strength and seal tightness of the cavern rock 3 it is advantageous to completely seal the cavern walls 2' in a manner known from tunnel building prior to pouring in concrete 6'. It may be useful with rock material which is not very dense to attach a pipe system 7 to the cavern walls 2', by means of which after completely filling the enveloping intermediate chamber with concrete it is possible to inject sealants known by a person skilled in the art to seal any remaining leaks in the rock material as fully as possible.

Furthermore, it may be an advantage in order to ensure the sealing tightness of the protective casing 5 to test the latter prior to filling with concrete or cement 6', in that (once the entry point in the extension of the access tunnel 4 is sealed hermetically—e.g. by an armour-plated steel door 5') excess pressure is generated in the casing 5, and the pressure produced in this way is measured over at least one hour. A person skilled in the art will be familiar with the details of such a test. The time path of the measured excess pressure can provide evidence of the tightness of the seal of the protective casing 5.

The described sealing and configuration method can also be used within the meaning of the claims for the secure storage of burnt out fuel rods, nuclear waste (fission products). The long-term and secure storage of these products is very contentious. In particular there is concern about fission products from leaky containers seeping into the ground water. By applying the teaching of the invention this safety problem can be reduced substantially and over the long term.

In particular, an installation according to the invention can be converted after its active energy-producing phase into a secure storage site for such products.

In order to secure the nuclear power station as a whole from terrorist attacks, in that it is designed to be difficult to see from the air, the cooling tower (not shown) can also be built into the rock. This also reduces the negative effect of the cooling cloud, as such an installation can also be built in an area with little agriculture. Compared to known installations in the mining sector the expense of such an arrangement is economically justifiable.

After an accident it is important to ensure that the residual heat (about 4-8% of the total reactor output) of the reactor can be removed. A person skilled in the art of reactor construction will be familiar with methods for making the residual heat safe even after the failure of the main cooling circuit with an additional cooling system.

The volumes and pipes configured according to 8, 9 can be fitted with thermal elements and radiation measuring devices. The latter are used for measuring the amount of heat and radiation doses during normal operation. These records can also be used to identify any abnormality in the operation of the reactor and to trigger the necessary shutdown. After an accident these results are also used for measuring and controlling the effectiveness of the secondary cooling.

It is efficient to add boron salts to the secondary circuit during and after an accident in order to obstruct any free neutron flows and thereby reduce the dangerous residual heat. In case of an accident therefore containers filled with boron water should be added to the secondary circuit of such liquid.

The injection of the sealant into the intermediate chamber 6 can be performed selectively according to the rock structure 3 through the pipes 7, in order to ensure as far as possible an even filling of the intermediate chamber 6 and sealing of the walls 2. The required regulation and control methods are well known to a person skilled in the art of such injections (in particular suitable sealants of the company Sika can be used which are already used in tunnel building or mining)

By means of the configuration of nuclear reactors in underground caverns 2 the risks of operation and the escape of radioactive fission products are substantially reduced in the case of internal accidents, external attacks and natural catastrophes.

In the following further protective measures are mentioned which can be used if necessary:
- the population in the surrounding area should be informed in detail about the nature of nuclear power;
- the population or community concerned should be included to a reasonable extent in the profit of the power station;
- the whole plant should be configured so that the latter cannot be identified as such from a distance;
- waste heat: this should be reused as far as possible. Heating network, cultivation of vegetables, stations in cold climates can make use of this source of energy to great advantage;
- cooling towers should be as inconspicuous as possible (camouflaged, e.g. built leaning against a mountain). A redundant configuration of the cooling system should be designed so that in case of a SCRAM the residual waste heat can be removed.

If despite all of the precautionary measures a MCA should occur, it should be possible to lock the entry and access to the reactor in order to allow the reactor to cool down without human intervention.

The access tunnel (tunnel 4) should be configured so that it can be locked rapidly in case of emergency or also can be buried.

As shown in the FIGURE the connecting pipes 9 and the supply pipes of the pipe system 7 bypass the sealing door 10 of the access tunnel 4.

If necessary in said access tunnel 4 also at least one additional external door can be provided (not shown), and thus at least one lock can be formed (possibly equipped with decontamination agents).

The following objects, components and elements of the invention are shown in the attached FIGURE:

) containment chamber (with reactor)
2) cavern
2') cavern walls
3) rocky ground/mountain
4) tunnel/shaft/access tunnel
5) steel protective casing
5') door of protective casing
6) intermediate volume/chamber
6') concrete/concrete casing
7) pipe system (for sealing)
8) hollow chambers
9) connecting pipes (for the measuring and connecting pipes)
10) door/shield in tunnel/access tunnel Of course, the invention is not limited to the described and shown embodiments. Changes e.g. in the embodiments of the different components or replacement by technical equivalents are possible, insofar as they remain within the scope of the claimed patent.

The invention claimed is:

1. A method for building an operational nuclear reactor installation, comprising a containment chamber surrounded by a protective casing, said method comprising:

finding or preparing a cavern (2) having cavern walls (2') in rocky ground or in a mountain (3), said cavern (2) being connected to the outside world via a tunnel or shaft (4), attaching a pipe system (7) to the cavern walls (2'), the pipe system being distributed circumferentially around the cavern walls, constructing or introducing a sealed protective casing (5) made of steel which delimits the containment chamber (1) forming an enveloping intermediate chamber volume (6) between the protective casing (5) and the cavern walls (2'), filling the intermediate chamber (6) with concrete or cement (6'), with the exception of the tunnel or shaft (4), wherein prior to filling the intermediate chamber (6) with concrete or cement (6'), hollow chambers (8) are arranged outside the protective casing (5) on an outside surface of the protective casing (5), said hollow chambers (8) being comprised of steel casings, said hollow chambers (8) remaining free of concrete (6') and being fitted with measuring devices and probes, prior to the pouring of the concrete, wherein prior to filling the intermediate chamber (6) with concrete or cement (6'), connecting pipes (9) fitted with cables are set up, said connecting pipes (9) and cables connecting the hollow chambers (8) one to another and to the outside world via the tunnel or shaft (4), and after filling the intermediate chamber (6) with concrete or cement (6'), using the attached pipe system (7) to seal leaks in the rock material of the cavern walls (2') with respect to gases and liquids by injecting a liquid sealant through the pipe system (7) distributed around the cavern walls, and wherein the operational nuclear reactor installation is built.

2. The method according to claim 1, wherein prior to filling the intermediate chamber (6) with concrete (6'), the cavern walls (2') are sealed from gases and liquids.

3. The method according to claim 1, wherein prior to filling the intermediate chamber (6) with concrete (6'), the tightness of the seal of the protective casing (5) is checked by generating and measuring internal excess pressure over a specific time period.

4. The method according to claim 1, further comprising the further steps of forming i) a sealable opening in the protective casing (5) into which the tunnel or shaft (4) opens and ii) at least one door that protects against radiation and excess pressure or a corresponding movable shield (10) in the tunnel or shaft (4), wherein the tunnel or shaft (4) has at least a cross section which is sufficient for maintenance and replacement purposes.

5. The method according to claim 2, wherein prior to filling the intermediate chamber (6) with concrete (6'), the tightness of the seal of the protective casing (5) is checked by generating excess pressure in the casing (5) and measuring the generated excess pressure over at least one hour.

6. The method according to claim 1, wherein prior to filling the intermediate chamber (6) with concrete (6'), the tightness of the seal of the protective casing (5) is checked by generating excess pressure in the casing (5) and measuring the generated excess pressure over at least one hour.

7. The method according to claim 1, wherein prior to filling the intermediate chamber (6) with concrete (6'), the tightness of the seal of the protective casing (5) is checked by generating excess pressure in the casing (5) and measuring the generated excess pressure over at least one hour.

8. The method according to claim 1, wherein said connecting pipes (9) cross the intermediate chamber (6), connecting said hollow chambers (8) to an outside wall via the tunnel or shaft (4).

9. The method according to claim 1, wherein said measuring devices and probes include thermal and radiation measuring devices.

* * * * *